United States Patent [19]

Howes

[11] Patent Number: 4,972,602

[45] Date of Patent: Nov. 27, 1990

[54] TONGS FOR HANDLING AND MEASURING CRABS

[76] Inventor: Charles P. Howes, 505 Beach Dr., Annapolis, Md. 21403

[21] Appl. No.: 380,381

[22] Filed: Jul. 17, 1989

[51] Int. Cl.$^5$ .................................................. G01B 5/02
[52] U.S. Cl. ..................................... 33/798; 33/558.01; 294/3
[58] Field of Search .................... 119/151, 154; 7/106; 33/558.01, 798, 799, 797, 800, 801, 810–812, 794, 795, 796, 807; 294/3; 81/424.5, 426, 425, 300

[56] References Cited

U.S. PATENT DOCUMENTS

| | | | |
|---|---|---|---|
| 942,529 | 12/1909 | Young et al. | 33/801 |
| 1,285,175 | 11/1918 | Hinkle | 33/798 |
| 1,821,953 | 9/1931 | White | 81/426.5 |
| 2,082,699 | 6/1937 | Keppinger | 294/3 X |

FOREIGN PATENT DOCUMENTS 254565  12/1948  Sweden .................. 33/797

Primary Examiner—Harry N. Haroian
Attorney, Agent, or Firm—Scrivener and Clarke

[57] ABSTRACT

A pair of pivotally connected crossed arms define tongs having handles at one end and recessed jaw parts at the other. The recesses in the jaw parts are of a size to receive therein the pointed end tips of a crab shell whereby a crab may be easily lifted without danger of being clawed. One of the arms carries a scale and the other a pointer such that when the tips of a crab shell are engaged in the recesses the distances between the tips is instantly indicated and a determination made whether or not the crab is above a minimum size to be kept.

7 Claims, 1 Drawing Sheet

TONGS FOR HANDLING AND MEASURING CRABS

This invention relates to handling devices and more particularly to tongs for safely handling hard shell crabs and at the same time measuring the width of a shell to ensure that the crab meets the minimum size required by law.

Hard shell crabs and particularly the blue crabs possess strong claws and are pugnacious by nature. It is a requirement of law in numerous jurisdictions that a crab, in order to be kept, must be a certain minimum size and if not it must be released. Heretofore, as a crab is caught it has usually been carefully grasped in the hand on its side opposite the claws and then measured by a linear ruler. A crab fresh from the water is slippery and unless one grasps the creature in exactly the right position he may be painfully bitten by the claws. Further, because a fresh caught crab is exceedingly active it is very difficult to get an accurate measurement, the legality of which is determined by the distance between the pointed tips of the shell.

When a supply of legal sized crabs has been caught they often are temporarily consigned to a basket, such as a bushel basket, and when it comes time to transfer the crabs to a cook pot one is faced with the problem of picking each crab up, which cannot be done safely by hand because, as one crab is grasped, the hand is attacked by other crabs. Thus the crabs are either dumped as a group into the cook pot, which is unsatisfactory for a number of reasons well-known to those who cook crabs, or they are man-handled into the pot by the use of some kind of forceps which are difficult to use simply because a crab can work its way free of the forceps.

The present invention is designed to do away with all of the problems of the prior art procedures for handling and measuring hard shell crabs.

In accordance with the invention special crab tongs are provided comprising a pair of arms which are pivotally connected intermediate their ends. The arms on one side of the pivotal connection carry handles and on the other carry jaw parts having respective recesses with their open ends facing each other and closed bottom ends, the recesses being of a size to accommodate the pointed end tips of a crab shell. One of the arms carries a scale marked in units of length and the other arm carries a pointer movable against the scale. The units of length are the respective distances, in inches, say, between the closed bottom ends of the recesses. The recesses enable a crab to be easily and safely picked-up and at the same time the length from tip-to-tip of the shell is measured. If the crab is too small it is simply retained in the tong jaws until it can be positioned over open water whereupon the jaws are moved apart to release the crab without further handling.

The invention will be better understood when it is considered in conjunction with the accompanying drawings wherein.

Figure 3:
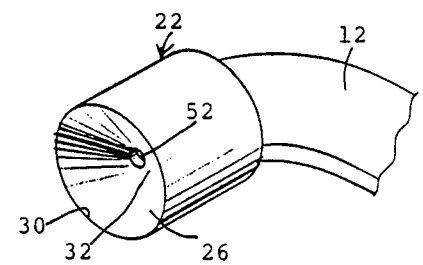
FIG. 3 is a broken perspective view showing details of a preferred jaw part.

Referring now to the drawings, the tongs of the invention are designated broadly by the numeral 10. The tongs comprise a pair of crossed arms 12, 14 having a pivotal connection 16 intermediate their ends. Handle means 18, 20 are located adjacent respective ends of the arms 12, 14 on one side of the pivotal connection 16. Jaw parts 22, 24 are located adjacent the respective opposite ends of the arms 12, 14 on the other side of the pivotal connection 16. The jaw parts 22, 24 have respective recesses 26, 28 therein arranged to be movable into substantial alignment with each other as the arms 12, 14 are operated to move the jaw parts towards each other. As shown in FIG. 3, the recesses 26, 28 have facing open ends 30 and closed bottom ends 32, the recesses extending substantially tangentially away from each other, relative to an arc about the pivot point 16, for the reception therein of the pointed end tips 34, 36 of a crab shell 38.

In accordance with the invention, a scale 40 is carried on one of the arms, say arm 14, and is calibrated in units of linear measurement, say, inches, corresponding to the distances between the closed ends 32 of the recesses 26, 28 over a preselected range of distances say 1 to 10 inches, as shown. A pointer 42 is carried on the other arm 12 for movement relative to the scale 40 as the handles 18, 20 are moved towards and away from each other and is so positioned that it points to that measurement unit on the scale corresponding to the distance between the closed ends 32 of the recesses 26, 28.

Figure 2:
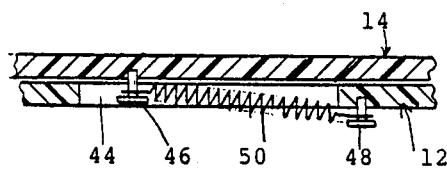
FIG. 2 is an enlarged cross-sectional view taken substantially on the line 2—2 of FIG. 1.

Desirably, spring means are provided which at all times operate on the arms 12, 14 to urge the jaw parts 26, 28 towards each other. Though the spring means could be located in any convenient position, as shown in FIG. 2, I provide a cut-out 44 in one of the arms 12 and fix a pin 46 to the other arm 14 to extend into the cut-out. I fix to the other arm adjacent an end of the cut-out a second pin 48 and interconnect the pins 46, 48 by a tension spring 50. The cut-out 44 may have an arcuate upper edge 52 struck about the pivot point 16 and may have a straight lower edge 54 or be otherwise profiled to be engaged by the pin 46 and serve as a stop to limit the opening range of the jaw parts to the maximum distance shown on the scale 40, say 10 inches.

Figure 1:
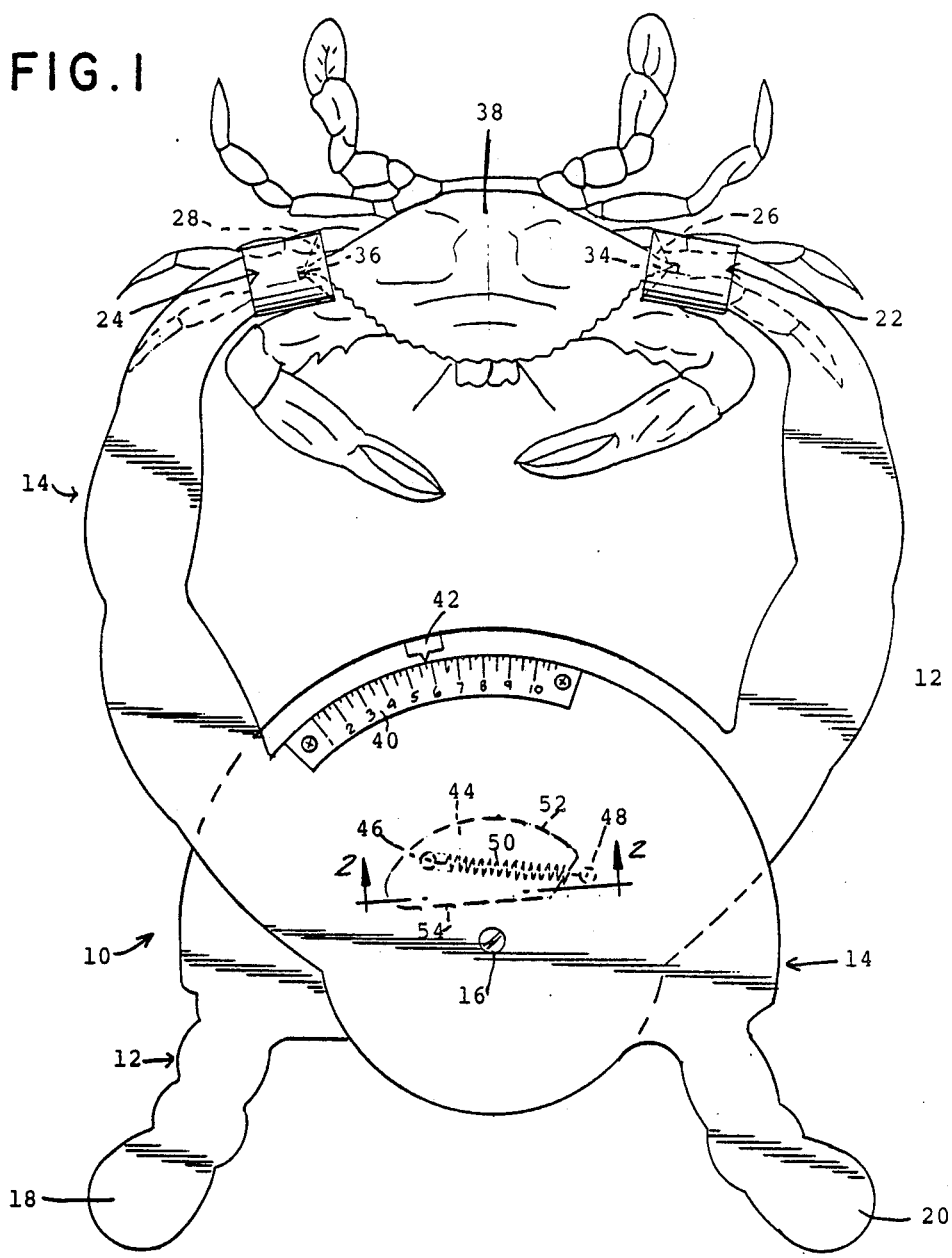
FIG. 1 is a plan view of the tongs of the invention shown in its operation of handling and measuring a crab.

Desirably the recesses 26, 28 taper from their open to their closed end and preferably the tapered recesses are conical as shown in FIG. 3, and include cylindrical recesses 52 at the closed ends 32 of the conical recesses, the cylindrical recesses 52 having a depth and diameter substantially complementary to the tips 34, 36 of a crab shell 38 as clearly shown in FIG. 1. Naturally where the preferred cylindrical recesses 52 are utilized, the scale 40 is calibrated in the distances between the bottoms of the cylindrical recesses.

The use of the invention should be clear from the foregoing description. Individual crabbers often catch crabs with weighted lines carrying bait such as a chicken neck. When a crab attaches itself to the neck to feed, the line is slowly pulled in until the crab is visible and can be scooped up in a crab net. If the crabber is in doubt about the size of the crab he has just caught, before the present invention, he would try to keep the crab in the net as he measured it but this was an uncertain way to perform this operation. With the present invention, the crabber would insert the tongs into the net through the open end thereof and grasp tips of the shell in the jaw parts as shown in FIG. 1. Because the crab is likely to attempt to cling to the net, the crabber can now release one of the handles and rely on the spring 50 to maintain the crab gripped in the jaw parts. This frees the other hand to manipulate the crab net until the crab is entirely free thereof. If the legal minimum size of a keepable crab is 5 inches from tip end to tip end but the pointer 42 indicates that the crab is less than 5 inches in length, the crabber merely suspends the crab over open water and manipulates the handles to open the jaw parts 22, 24 and release the crab.

Should a crab be clearly greater in size than the legal minimum, the measurement feature of the invention is unimportant but the tongs are now used strictly for handling the crab, not only to remove it from the net to a temporary container but later from the container to a cooking pot.

It will be apparent to those skilled in the art that the invention is susceptible of a variety of changes and modifications without, however, departing from the scope and spirit of the appended claims.

What is claimed is:

1. A combined crab measuring and handling tongs comprising a pair of crossed arms having a pivotal connection intermediate their ends, handle means adjacent respective ends of said arms on one side of said pivotal connection, jaw parts adjacent the respective opposite ends of said arms on the other side of said pivotal connection, said jaw parts having respective conical recesses therein arranged to be movable into substantial alignment as said arms are operated to move said jaw parts towards each other, said recesses having facing open ends and closed bottom ends and tapering from their open to towards their closed ends, said recesses extending substantially tangentially away from each other and including cylindrical recesses at their closed ends for the reception therein of the pointed end tips of a crab shell, said cylindrical recesses having depths and diameters complementary to the tips of a crab shell.

2. The tongs of claim 1 including a scale carried on one of said arms calibrated in units of linear measurement corresponding to the distances between the closed bottom ends of said recesses over a preselected range of distances, and a pointer carried on the other arm for movement relative to said scale, said pointer being positioned on said other arm that it points to that measurement unit on said scale corresponding to the distance between the closed bottom ends of said recesses.

3. The tongs of claim 1 including spring means operating on said arms at all times urging said jaw parts towards each other.

4. The tongs of claim 1 including a scale carried on one of said arms calibrated in units of linear measurement corresponding to the distances between the closed ends of said cylindrical recesses over a preselected range of distances, and a pointer carried on the other arm for movement relative to said scale, said pointer being positioned on said other arm that it points to that measurement unit on said scale corresponding to the distance between the closed ends of said cylindrical recesses.

5. The tongs of claim 3 including a cut-out in one of the arms, a first pin on the other of said arms extending into said cut-out, a second pin on said one arm and a tension spring extending between said pins.

6. The tongs of claim 5 wherein said cut-out includes a profiled part engageable by said first pin to limit the maximum distance said jaw parts may be moved apart.

7. A combined crab measuring and handling tongs comprising a pair of crossed arms having a pivotal connection intermediate their ends, handle means adjacent respective ends of said arms on one side of said pivotal connection, jaw parts adjacent the respective opposite ends of said arms on the other side of said pivotal connection, said jaw parts having respective recesses therein arranged to be movable into substantial alignment as said arms are operated to move said jaw parts towards each other, said recesses having facing open ends and closed bottom ends, said recesses extending substantially tangentially away from each other for the reception therein of the pointed end tips of a crab shell, spring means operating on said arms at all times urging said jaw parts towards each other, a cut-out in one of the arms, a first pin on the other of said arms extending into said cut-out, and a second pin on said one arm, said spring means comprising a tension spring extending between said pins, said cut-out including a profiled part engageable by said first pin to limit the maximum distance said jaw parts may be moved apart.

* * * * *